(12) United States Patent
Cooper

(10) Patent No.: US 7,487,600 B1
(45) Date of Patent: Feb. 10, 2009

(54) TAPE MEASURE WEIGHT

(76) Inventor: Jason D. Cooper, 7425 Garden Gate Dr., Citrus Heights, CA (US) 95621

( * ) Notice: Subject to any disclaimer, the term of this patent is extended or adjusted under 35 U.S.C. 154(b) by 0 days.

(21) Appl. No.: 11/801,846

(22) Filed: May 11, 2007

(51) Int. Cl.
G01B 3/10 (2006.01)

(52) U.S. Cl. ......................................... 33/770

(58) Field of Classification Search ............... 33/770, 33/755, 757, 758, 759, 760
See application file for complete search history.

(56) References Cited

U.S. PATENT DOCUMENTS

| | | | |
|---|---|---|---|
| 2,523,351 A | | 9/1950 | Armstrong |
| 2,853,785 A | * | 9/1958 | Raifsnider .................. 33/760 |
| 3,145,477 A | * | 8/1964 | Morrison .................... 33/770 |
| 4,294,016 A | | 10/1981 | Wilkerson |
| 4,353,167 A | | 10/1982 | Martin |
| 4,827,622 A | * | 5/1989 | Makar ........................ 33/770 |
| 5,138,891 A | | 8/1992 | Johnson |
| 5,421,100 A | * | 6/1995 | Leore ......................... 33/770 |
| 5,458,946 A | * | 10/1995 | White, Jr. .................. 428/131 |
| 5,873,174 A | | 2/1999 | Kraft |
| 6,427,358 B1 | * | 8/2002 | LeBon et al. ............... 33/758 |
| 6,481,110 B1 | * | 11/2002 | Butler ........................ 33/393 |
| 6,511,112 B2 | * | 1/2003 | Schroeder .................. 294/65.5 |
| 6,578,274 B1 | * | 6/2003 | Tango et al. ................ 33/1 G |
| 6,663,153 B2 | | 12/2003 | Brunson |
| 7,024,792 B2 | * | 4/2006 | Graham ...................... 33/770 |
| 2002/0184783 A1 | | 12/2002 | Poineau |
| 2002/0185877 A1 | * | 12/2002 | Brunson .................... 294/65.5 |
| 2003/0167651 A1 | * | 9/2003 | Pedersen .................... 33/758 |

FOREIGN PATENT DOCUMENTS

DE 296 03 690 6/1996

* cited by examiner

*Primary Examiner*—Christopher W Fulton
(74) *Attorney, Agent, or Firm*—Heisler & Associates

(57) ABSTRACT

A weight is provided for attachment to a tip of a tape measure and to facilitate stabilization of the tip when extending far from a housing thereof. The weight includes a cavity passing through a high mass body with a slot extending between the cavity and an exterior of the body. The slot is configured to allow the tape to pass therethrough, to enter the cavity. The cavity is sized to allow a clasp at a tip of the tape to reside therein. The slot is preferably curved to match a curvature of a common metal roll-up tape measure. A recess can be provided on the body adjacent the cavity to accommodate a portion of the clasp of the tape therein. Magnets can optionally be provided on the body to allow the weight to be attachable to ferromagnetic surfaces. A door can optionally be provided which selectively closes the slot.

23 Claims, 2 Drawing Sheets

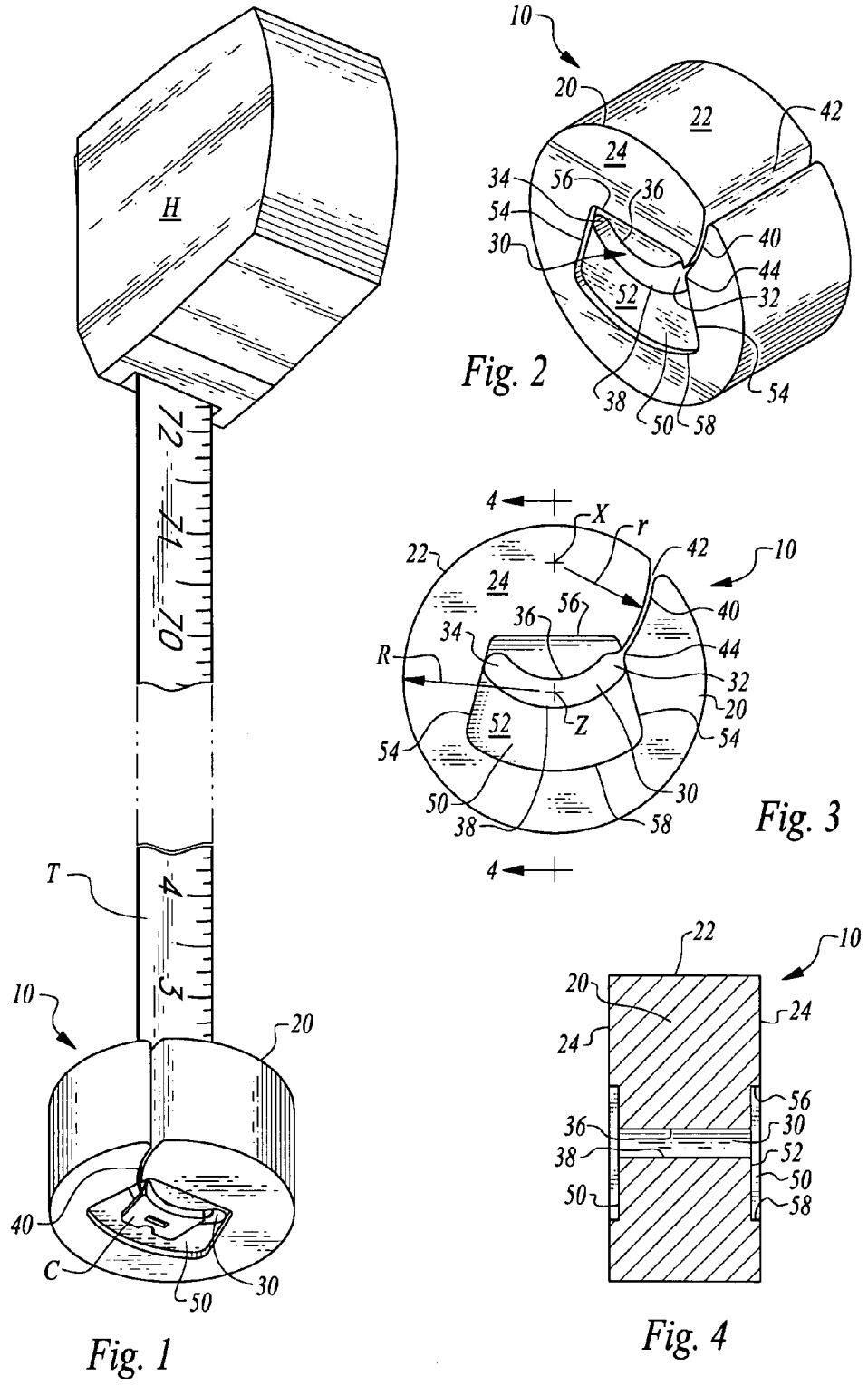

TAPE MEASURE WEIGHT

FIELD OF THE INVENTION

The following invention relates to common metal roll-up tape measures, such as those which are often used in construction trades, and which typically measure approximately twenty-five feet in length with a curving cross-section. More particularly, this invention relates to accessories for metal roll-up tape measures, and particularly accessories attachable to a tip of such metal roll-up tape measures.

BACKGROUND OF THE INVENTION

When measurements are to be made, especially within the construction trades, a most common prior art tool utilized for such measurements is a metal roll-up tape measure. Such common metal tapes are particularly useful when measuring relatively short distances, and particularly distances of twenty-five feet or less, where the tape measure is not particularly bulky, but rather can be easily worn upon a belt or tool belt of a construction worker or other user. Such common metal tapes typically include a housing which contains the tape in a rolled up configuration. The tape rolls up into a spiral and has a spring near a center thereof which applies a torsional force tending to roll up the tape. A slit in the housing allows the tape to pass out of and into the housing. Typically, a lock is provided adjacent the slit so that the tape can be locked in a deployed position if desired.

Such common metal tapes typically include a stiffening feature so that the tape can flexibly roll up within the housing, but the tape is relatively stiff when deployed from the housing. In particular, the tape is configured to have a curvature between lateral edges, typically with a radius of curvature of about ½ inch. This curvature makes the tape relatively stiff and difficult to buckle in one direction, but can relatively easily buckle in an opposite direction. The tape is rolled up in the direction which facilitates buckling, but is deployed out of the housing with gravity loads acting on the tape in its more stiff direction. Indicia, typically including gradation lines and numerical markings corresponding with distances from a tip of the tape, are most commonly provided only on an upper surface of the tape, further encouraging the user to have this side face upward so that the tape remains stiff when deployed.

One problem with common metal tapes is the difficulty associated with making precise measurements of distances greater than about eight to twelve feet when a user is utilizing the tape without a partner. While a tip of the tape typically includes a clasp which can grip an edge of a structure at a reference location, not all measurements being made include a convenient corner of a structure at the reference location for engagement of a tooth of the clasp. When a reference location is eight feet or less away, the stiffness of the tape allows the single user to hold the tape relatively steady. However, as measurements grow increasingly longer, the user is often frustrated by an inability to precisely locate the clasp at the reference location and keep the tip of the tape at this reference location until the measurement can be successfully taken.

One common scenario often encountered, especially by construction workers is the difficulty associated with making vertical measurements especially when the user is measuring downward from above down toward a reference surface. The work environment is often exposed to the elements including wind. The tape is sufficiently lightweight, that wind will blow on the tape as it extends downwardly. The user is thus prevented from getting an accurate measurement, unless an assistant is available to hold the tip of the tape.

Accordingly, a need exists for an accessory for a tip of a common metal tape which can hold the tip of the tape steady to allow a single user to take accurate measurements, and particularly when measuring distances in a vertical downward direction.

SUMMARY OF THE INVENTION

With this invention, a tape measure weight is provided which is attachable to a tip of a common metal tape, such as an approximately twenty-five foot long roll-up metal tape measure having a toothed clasp fastened to a tip thereof and with the tape exhibiting a curving cross-section between lateral edges of the tape. The weight includes a body which is relatively heavy compared to a weight of the tape. In particular, the body is preferably at least twice as heavy as the tape, and most preferably at least ten times as heavy as the tape. With this relatively high mass, any wind loads acting on the tape when the tape is extending vertically downwardly are significantly attenuated.

The body includes a cavity therein which can hold a portion of the tape passing therethrough. A slot is provided extending through the body from an outside of the body into the cavity. This slot is configured to allow the tape to pass laterally therethrough and into the cavity.

Most preferably, this slot has a curving form that approximates a curvature of the common metal tape, such that the tape follows a curving path as it slides through the slot and into the cavity. The slot also preferably has a thickness which is slightly greater than a thickness of the tape, but less than a thickness of the clasp. Thus, the clasp cannot pass through the slot but the tape can pass through the slot. The cavity is sized slightly larger than the clasp so that the clasp can reside within the cavity. With such a configuration, the tape can be readily passed into the cavity through the slot and held securely within the cavity without inadvertent removal therefrom.

A recess preferably surrounds portions of the cavity with the recess having a depth down to a floor which is preferably substantially perpendicular to the cavity. This recess is sized larger than the tooth at the tip of the clasp and preferably has a depth similar to a thickness of the tooth. Thus, when the weight is coupled to the tape measure with the clasp located within the cavity, a totally precise measurement can be taken from a reference surface in contact with a side of the body adjacent the tooth, and the tooth can be nested within the recess. Most preferably, each end of the cavity includes a recess therein, such that the weight is reversible and can be mounted onto the tape measure in two different orientations.

Furthermore, the weight preferably includes at least one magnet therein so that the body of the weight can attach to a ferromagnetic surface at a reference location, either when the tape is utilized in a vertically downward direction or when the tape is utilized horizontally. Also, a door is preferably provided adjacent the slot which can close over the slot to act as a safety mechanism to prevent any possibility of the weight becoming dislodged from the tip of the tape measure.

OBJECTS OF THE INVENTION

Accordingly, a primary object of the present invention is to provide a weight for a tape measure to facilitate holding of a tip of a common metal tape adjacent a reference location when extending vertically downward, especially in windy conditions.

Another object of the present invention is to provide a tape measure weight which is readily attachable to a tip of a common metal tape.

Another object of the present invention is to provide a tape measure weight which is securely held to a tip of a common metal tape, but which can be easily removed when desired.

Another object of the present invention is to provide a method for measuring distances, and especially vertically downward distances, especially when a user is working alone.

Another object of the present invention is to provide a tape measure weight which can have a tip thereof held securely to a ferromagnetic surface at a reference location.

Another object of the present invention is to provide a tape measure weight which rests against a surface at a reference location and provide a very precise measurement of a distance away from the reference location.

Another object of the present invention is to provide a tape measure weight which is sufficiently heavy to resist significant movement when common wind loads are encountered by the tape.

Another object of the present invention is to provide a tape measure weight which can be easily and reliably formed from commonly available materials in a high quality low cost fashion.

Other further objects of the present invention will become apparent from a careful reading of the included drawing figures, the claims and detailed description of the invention.

BRIEF DESCRIPTION OF THE DRAWINGS

FIG. 1 is a perspective view of the tape measure weight of this invention in use upon a common metal roll-up tape measure.

FIG. 2 is a perspective view of the tape measure weight shown alone.

FIG. 3 is a bottom plan view of that which is shown in FIG. 2.

FIG. 4 is a full section side elevation view of that which is shown in FIG. 2, taken along lines 4-4 of FIG. 3.

DESCRIPTION OF THE PREFERRED EMBODIMENT

Figure 5:
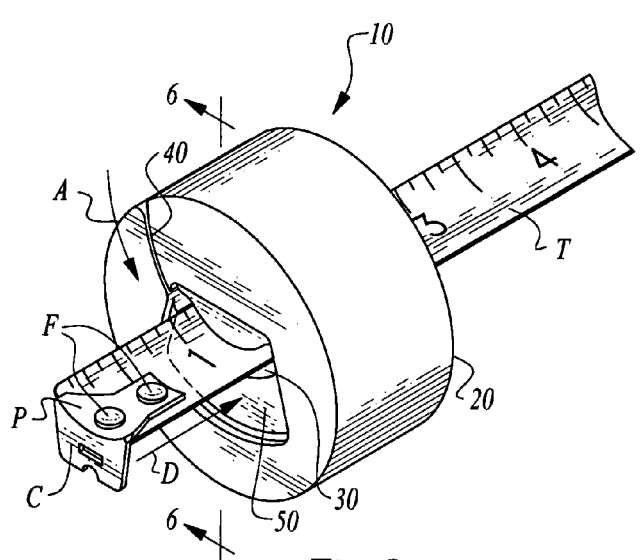
FIG. 5 is a perspective view of the tape measure weight of this invention shown with a tip of a tape measure in the process of being inserted into a cavity in a center portion of a body of the tape measure weight.

Referring to the drawings, wherein like reference numerals represent like parts throughout the various drawing figures, reference numeral 10 is directed to a tape measure weight (FIG. 1) which is attachable to a tip of a tape T, adjacent a clasp C, especially to keep the tape T steady while taking measurements in a vertical downward direction. The tape measure weight 10 has a mass significantly greater than a mass of the tape T so that wind loads and other lateral forces applied to the tape T do not provide significant movement of the tape T during the taking of vertical downward measurements with the tape T.

In essence, and with particular reference to FIGS. 1-4, basic details of the tape measure weight 10 of this invention are described according to a preferred embodiment. The tape measure weight 10 is primarily formed of a body 20 having a cavity 30 formed therein and passing entirely therethrough (FIG. 4). This cavity 30 receives the clasp C of the tape T therein such that a tip of the tape T is held adjacent the weight 10. A slot 40 extends through the body 20 to the cavity 30 to provide access to the cavity 30 for the tape T. At least one recess 50 (and preferably two) is located on a surface of the body 20 surrounding the cavity 30. This recess 50 accommodates a tooth at a tip of the clasp C, so that the clasp C can be nested slightly into the body 20 and the tape T can make accurate measurements with the portions of the body 20 surrounding the recess 50 located at a reference location for the tape T.

The body 20 can be fitted with magnets 80 (FIG. 6) to allow the body 20 to be held against a ferromagnetic surface which is either located below a holder H of the tape T or which can be oriented horizontally spaced away from the holder H of the tape T, or in other orientations. The body 20 can also be fitted with a door 60 which rides along a track 70 (FIGS. 7 and 8) between an open position and a closed position to selectively open and close access to the slot 40.

More specifically, and with particular reference to FIGS. 1 and 5, particular details of a common metal roll-up tape measure are described for the tape T being accommodated by the various different characteristics of the tape measure weight 10 of this invention. Such common metal roll-up tape measures typically include a holder H which receives portions of the tape T in a rolled up configuration adjacent a torsion spring tending to draw the tape T into the housing H. A clasp C is located at a tip of the tape T. This clasp C is typically bent and includes a plate P which is substantially coextensive with the tape T at a tip of the tape T, and with a tooth extending perpendicular to a long axis of the tape T and perpendicular to the plate P.

Fasteners F typically pass through the plate P and through the tape T to secure the clasp C to the tape T. The tape T exhibits a curvature between lateral edges of the tape T which causes the tape T to be stiffer in one direction than in another so that it can resist bending loads in a downward direction but can be readily bent to roll up inside the housing H. The tape T also includes gradations in the form of lines thereon and indicia adjacent at least some of the gradations, to facilitate utilization of the tape T for measuring distances away from the tip of the tape T.

The tape T typically has a thickness of approximately 1/64 of an inch. The portions of the clasp C including the plate P and fasteners F add to a thickness of the tape T where the tape T overlaps the clasp C. In particular, this portion of the tip of the tape T where the tape T overlaps with the clasp C typically has a thickness of slightly greater than 1/8 of an inch. For instance, the plate P can be 1/64 of an inch and the fasteners F can be in the form of rivets with heads above the plate P and below the tape T with each of the heads having a thickness of 1/64 of an inch. A slight amount of tolerance is typically provided between the heads of the fastener F and the plate P, so that the plate P can slide slightly relative to the fasteners F in the tape T, so that the tooth of the clasp C can accommodate both inside and outside measurements and slide about 1/64 of an inch with the tooth having a thickness of 1/64 of an inch, so that the tape T always makes very precise measurements whether bumping up against a surface at the reference location or gripping an edge of a structure at the reference location. The tape T preferably has a radius of curvature of about 1/2 of an inch. The tape T typically has a length of twenty-five feet. However, the tape T could actually have a variety of different lengths. The tape T typically has a width between lateral edges thereof that is between ¾ of an inch and one inch, but various different widths of the tape T could also be accommodated by making appropriate corresponding adjustments to dimensions of the tape measure weight 10 of this invention.

With particular reference to FIGS. 2-4, particular details of the body 20 of the tape measure weight 10 are described, according to this preferred embodiment. The body 20 is preferably a unitary mass of rigid high density and high specific weight material. Most preferably, the body 20 is formed of lead. However, the body 20 could also function somewhat effectively if formed of steel, iron, or other metals or other materials having a similar specific gravity. Preferably, the body 20 is coated to prevent human exposure to the lead forming the body 20. If such a coating is provided, dimensions of the body 20 would typically be slightly undersized so that after coating of the body 20, surfaces thereof would have a final size matching dimensions described in detail below. Such a coating could be in the form of a paint, elastomeric coating, wax, plating material, vapor deposition layer, or other surface coating.

The body 20 is preferably cylindrical in form with a cylindrical surface 22 extending between a pair of parallel circular flat surfaces 24. The flat surfaces 24 preferably have a diameter of approximately two inches such that a radius R of the body 20 is approximately one inch. A central point in the flat surfaces 24 of the body 20 depicted as point Z of FIG. 3. While the body 20 could have a variety of different thicknesses between the flat surfaces 24, most preferably the thickness of the body 20 is about one inch.

With continuing reference to FIGS. 2-4, particular details of the cavity 30 are described according to this preferred embodiment. The cavity 30 provides an opening passing between the flat surfaces 24, preferably substantially perpendicular to the flat surfaces 24 and aligned with the center point Z of the body 20. The cavity 30 preferably has a substantially constant cross-sectional contour between the flat surfaces 24. This contour preferably is in the form of a curve (FIG. 3) extending from an entry 32 to a terminus 34 with sides defined by an inner curve 36 and an outer curve 38.

These curves 36, 38 are each preferably spaced a common distance from a curving centerline passing through the center point Z and aligned with a curving center line of the slot 40. Preferably, a length of the cavity 30 from the entry 32 to the terminus 34 is approximately one inch, such that an entire width of the tape T is accommodated within the cavity 30. A width of the cavity 30 between the inner curve 36 and outer curve 38 is preferably greater than a thickness of the clasp C at the tip of the tape T. Thus, the clasp C can rest within the cavity 30 with both the plate P and fasteners F oriented between the inner curve 36 and outer curve 38.

As an optional alternative, the cavity 30 could be narrower between the curves 36, 38 and merely include relief spaces in the inner curve 36 and outer curve 38 to accommodate the plate P and fasteners F resting within the cavity 30. While the cavity 30 preferably has this curving contour and particular dimensions, a basic form of this invention could be provided where the cavity 30 is merely any form of opening passing through the body 20 and accommodating the clasp C at the tip of the tape T therein, with the cavity 30 sufficiently small to keep the tooth at the end of the clasp C from passing through the cavity 30.

With continuing reference to FIGS. 2 and 3, particular details of the slot 40 are described. The slot 40 provides a preferred form of a means to allow the tape T to pass laterally through the body 20 and into the cavity 30. The slot 40 extends from an inlet 42 adjacent the cylindrical surface 22 to an outlet 44 adjacent the entry 32 into the cavity 30. The slot 40 preferably curves between the inlet 42 and the outlet 44 along a curving path aligned with the curving centerline of the cavity 30 and defined by the radius r (FIG. 3). This radius of curvature for the slot 40 and the centerline of the cavity 30 is preferably approximately ½ inch, and preferably matches a curvature of the tape T. If a tape T having a different curvature is provided, most preferably the radius r would be modified to match this curvature for the tape T. The center point of this radius of curvature r is provided at the point X, which is most preferably approximately midway between the center point Z of the body 20 and the cylindrical surface 22, as shown in FIG. 3.

Because the slot 40 exhibits this curvature, the tape T can be passed through the slot 40 and into the cavity 30 by following a curving path with the tape T extending laterally through the slot 40 from the inlet 42 to the outlet 44. This motion is depicted along arrow A of FIG. 5. After the tape T has passed through the slot 40 and into the recess 50, the tape T can be translated (along arrow D of FIG. 5) until the clasp C is nested within the cavity 30 (see FIG. 1).

With continuing reference to FIGS. 2-4, particular details of the recess 50 are described according to this preferred embodiment. Most preferably, a recess 50 is provided in each flat surface 24 of the body 20 surrounding ends of the cavity 30. As an alternative, a single recess 50 could be provided. Each recess 50 preferably includes a floor 52 parallel with the flat surface 24 and perpendicular to a direction in which the cavity 30 passes through the body 20. The depth of this floor 52 away from the flat surface 24 is preferably similar to a thickness of the tooth at the tip of the clasp C on the tape T. Such a depth for the recess 50 allows the tooth on the clasp C to be recessed within the body 20 so that very precise measurement can be provided when the flat surface 24 of the body 20 is directly adjacent a surface at the reference location while the tape 10 is being utilized to take a measurement away from this reference location.

The recess 50 preferably has a size and perimeter contour sufficiently large to entirely contain the tooth of the clasp C therein. For instance, the recess 50 can include a pair of diverging walls 54 adjacent the terminus 34 and entry 32 of the cavity 30 and with a short wall 56 joining the diverging walls 54 closest to the inner curve 36 and with a curving wall 58 joining the diverging walls 54 together adjacent the outer curve 38. Walls 54, 56, 58 together define a perimeter of the recess 50 which most generally merely is sized and shaped to accommodate the tooth of the clasp C therein. With the recess 50 formed in each of the flat surfaces 24, the weight 10 becomes reversible.

Figure 6:
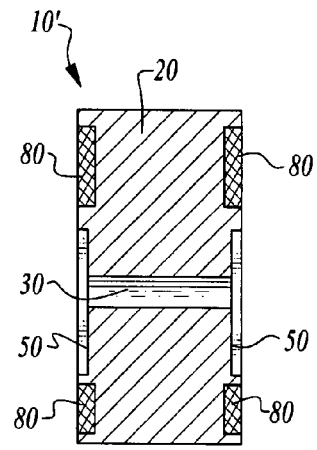
FIG. 6 is a full sectional view similar to that which is shown in FIG. 4, but for an embodiment of the tape measure weight which includes magnets therein.

With particular reference to FIG. 6, details of the weight 10' in a form which includes magnets 80, are described. In particular, the flat surfaces 24 of the body 20 can be provided with magnets 80 embedded therein. Most preferably, these magnets 80 have exterior surfaces which are flush with the flat surfaces 24. Magnets 80 can have either north or south poles extending outwardly therefrom. With these magnets 80 included in the flat surfaces 24, the flat surfaces 24 can be placed directly adjacent a ferromagnetic surface and the magnets 80 are preferably sufficiently strong to hold a weight of the body 20 against the ferromagnetic surface. Such magnets 80 are usable either when the tape T is extending downwardly (FIG. 1) or when utilized in a horizontal fashion or in other orientations. While the body 20 is preferably formed of lead, the body 20 could be entirely formed of magnetic material, such as with one of the flat surfaces 24 exhibiting a north pole and the other of the flat surfaces 24 exhibiting a south pole.

Figure 7:
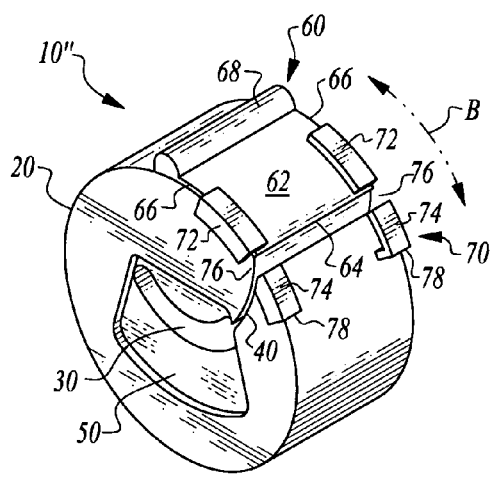
FIG. 7 is a perspective view of the tape measure weight of this invention with a door and associated track included thereon for selective closing of a slot accessing the cavity within the tape measure weight.
Figure 8:
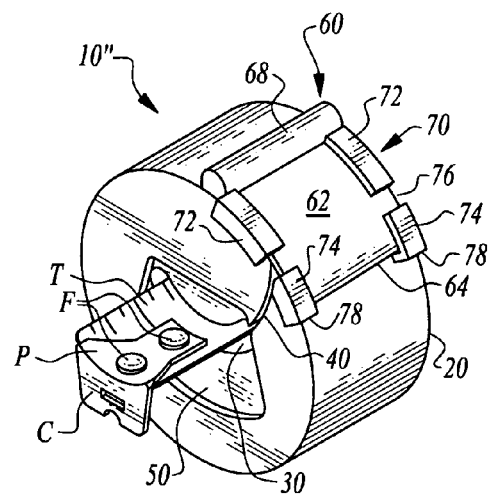
FIG. 8 is a perspective view similar to that which is shown in FIG. 7, but after a door thereof has been slid to a closed position.

With particular reference to FIGS. 7 and 8, details of an optional door 60 and track 70 are described. The door 60 provides a preferred form of a means to cover or otherwise disable the slot 40 to preclude the possibility of the tape T becoming inadvertently dislodged out of the cavity 30 through the slot 40. While the door 60 could most broadly be considered to be any structure which at least partially blocks the slot 40, one embodiment for the door 60 is configured as shown in FIGS. 7 and 8.

In particular, the door 60 preferably includes a panel 62 which forms a portion of a cylinder with a curvature matching a curvature of the cylindrical surface 22 of the body 20. This panel 62 has a tip 64 at a first straight edge thereof and a rib 68 at an edge of the panel 62 opposite the tip 64. Edges 66 curve between the tip 64 and the rib 68 on either side of the panel 62. These edges 66 are preferably spaced apart by a distance similar to a thickness of the body 20.

The track 70 is provided at a transition between the flat surfaces 24 and the cylindrical surface 22 on the body 20. These tracks 70 are preferably provided in two parts at each of these edges, including long brackets 72 on one side of the slot 40 and short brackets 74 on an opposite side of the slot 40. A gap 76 is provided between the long brackets 72 and the short brackets 74, to facilitate tape T access to the slot 40. The short brackets 74 preferably include stops 78 at ends thereof most distant from the gap 76.

These brackets 72 preferably have a generally "L-shaped" cross-section which extends over the cylindrical surface 22 of the body 20 at a distance spaced away from the cylindrical surface 22 similar to, but slightly greater than, a thickness of the panel 62 of the door 60. The brackets 72, 74 along each edge are spaced apart from each other by a distance similar to a width of the panel 62 between edges 66. Thus, the door 60 can slide while captured within the brackets 72, 74 between an open position and a closed position (along arrow B of FIG. 7). In particular, FIG. 7 depicts the door 60 in an open position, with FIG. 8 depicting the door 60 in a closed configuration.

Most preferably, the long brackets 72 are configured along with the tip 64 so that the door 60 cannot be entirely slid out of the track 70, but rather would catch before the panel 62 could slide entirely off of the track 70. For instance, the panel 62 could have a slight raised portion adjacent the tip 64 which would abut a portion of the long brackets 72 which is most distant from the gap 76 and that is spaced slightly closer to the cylindrical surface 22, so that the raised portion of the panel 62 adjacent the tip 64 cannot pass entirely out of capture underneath the long brackets 72, at least not without applying additional force to deflect the raised portion of the tip 64 and/or closer portions of the brackets 72. In this way, the door 60 would remain captured within the track 70 but could still slide between the open and closed configurations.

Furthermore, some form of detent could be provided within the short brackets 74 that the raised portion of the tip 64 could snap past just before the tip 74 abuts the stops 78. In this way, the door 60 would be held in the closed configuration when the tip 64 is adjacent the stops 78, unless a sufficiently high opening force is applied, such as to the ribs 68 on the door 60, to push the raised portion of the tip 64 past such detents in the short brackets 74. As an alternative, the panel 62 of the door 60 could be provided with a somewhat friction fit between the brackets 72, 74 and the cylindrical surface 22, so that the door 60 has a high friction configuration and remains stationary at a variety of different positions, rather than sliding easily between open and closed positions, and thus can remain safely closed when the tape T is captured within the weight 10".

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A weight for attachment to a tip of a common metal roll-up tape measure with a tape having a curving contour when deployed, the weight comprising in combination:
   a body;
   said body having a cavity adapted to contain at least a portion of a clasp attached to a tip of the common metal tape;
   a slot formed in said body;
   said slot extending from an inlet at an outer surface of said body to an outlet into said cavity; and
   said slot curving between said inlet and said outlet.

2. The weight of claim 1 wherein said slot exhibits a cylindrical curvature adapted to sufficiently match a cylindrical curvature of the tape to allow the tape to pass laterally through said slot from said inlet to said outlet and into said cavity.

3. The weight of claim 2 wherein said slot is wider than a thickness of the tape and narrower than a thickness of the clasp at a tip of the common metal tape measure, such that the tape can pass through said slot but the clasp cannot pass through said slot.

4. The weight of claim 3 wherein said cavity is adapted to be wider than a thickness of the clasp, such that the clasp can be received within said cavity.

5. The weight of claim 4 wherein said cavity is surrounded by a recess, said recess having a substantially planar floor substantially perpendicular to said cavity, said recess having a perimeter sized at least as large as the clasp, such that the clasp can be received within said recess.

6. The weight of claim 5 wherein said recess has a depth similar to a depth of a tooth at an end of the clasp on the tip of the common metal tape measure.

7. The weight of claim 6 wherein said slot has a width of between $1/64$ of an inch and $1/8$ of an inch, and wherein said cavity has a width greater than $1/8$ of an inch.

8. The weight of claim 7 wherein said slot has a width of approximately $1/32$ of an inch and said cavity has a width of approximately $3/16$ of an inch.

9. The weight of claim 8 wherein said slot has a radius of curvature of approximately $1/2$ of an inch.

10. The weight of claim 1 wherein said body includes at least one magnet thereon.

11. The weight of claim 1 wherein a door is coupled to said body, said door adapted to selectively cover said inlet of said slot.

12. The weight of claim 11 wherein said door includes a panel and at least two tracks, said tracks adapted to contain said panel adjacent said body, said door having at least two positions including a first open position with said panel adjacent said body and spaced from said inlet of said slot and a closed position with said panel adjacent said body and covering said inlet of said slot.

13. The weight of claim 12 wherein said body includes a cylindrical surface extending between flat circular surfaces at edges, each of said edges having one of said tracks extending therefrom, said panel having a cylindrical contour approximately matching a radius of said cylindrical surface, said panel adapted to slide along a curving path adjacent said cylindrical surface and between said tracks, to transition between said open position and said closed position.

14. A tape measure weight, such as for attachment to a tip of the tape, the tape measure weight comprising in combination:
 a body;
 said body having a cavity adapted to contain a portion of said tape therein;
 a slot formed in said body;
 said slot extending from an inlet at an outer surface of said body to an outlet into said cavity; and
 wherein said slot curves between said inlet and said outlet.

15. A tape measure weight, such as for attachment to a tip of the tape, the tape measure weight comprising in combination:
 a body;
 said body having a cavity adapted to contain a portion of said tape therein;
 a slot formed in said body;
 said slot extending from an inlet at an outer surface of said body to an outlet into said cavity;
 wherein said cavity is elongate in form between an entry adjacent said slot and a terminus opposite said entry, said cavity having a width that is greater than a width of said slot; and
 wherein said slot has a width which is less than a thickness of a clasp at a tip of the common metal tape, said cavity having said cavity width greater than a thickness of the clasp, such that the clasp can reside within said cavity but not within said slot.

16. A tape measure weight, such as for attachment to a tip of the tape, the tape measure weight comprising in combination:
 a body;
 said body having a cavity adapted to contain a portion of said tape therein;
 a slot formed in said body;
 said slot extending from an inlet at an outer surface of said body to an outlet into said cavity; and
 wherein said body includes a recess surrounding said cavity, said recess including a floor defining a portion of said body which is thinner than portions of said body not including said recess.

17. A tape measure weight, such as for attachment to a tip of the tape, the tape measure weight comprising in combination:
 a body;
 said body having a cavity adapted to contain a portion of said tape therein;
 a slot formed in said body;
 said slot extending from an inlet at an outer surface of said body to an outlet into said cavity; and
 wherein said body includes a door coupled thereto, said door adapted to selectively cover said inlet of said slot.

18. A method for holding a tip of a common roughly twenty-five foot long metal roll-up tape measure, to facilitate measuring therewith, especially in a vertically downward direction, the method including the steps of:
 providing a tape measure weight for attachment to the tip of the tape measure, the tape measure weight including a body; the body having a cavity adapted to contain a portion of the tape therein; a slot formed in the body; and the slot extending from an inlet at an outer surface of the body to an outlet into the cavity;
 attaching the tape measure weight to the tip of the common metal tape measure;
 deploying the tape from a housing until the tip of the tape is at a reference location, with the weight resisting wind loads applied to the tape; and
 reading indicia on the tape indicative of a distance from the reference location.

19. The method of claim 18 wherein said deploying step includes the step of allowing the tape measure weight to contact an underlying surface at the reference location.

20. The method of claim 18 wherein said providing step includes the step of including at least one magnet within the body; and
 wherein said deploying step includes the step of coupling the body to a surface at the reference location magnetically.

21. The method of claim 18 wherein said attaching step includes the steps of:
 configuring the slot to curve between an inlet at an outer surface of the body to an outlet into the cavity, the slot curving between the inlet and the outlet with a curvature approximating a curvature of the common metal tape measure; and
 sliding the tape into the slot laterally along a curving path between the inlet of the slot and the outlet of the slot.

22. The method of claim 21 wherein said configuring step includes the step of sizing the slot to have a width greater than a width of the tape and less than a width of a clasp at a tip of the common metal tape measure;
 wherein said sliding step includes the step of sliding a portion of the tape measure not including the clasp through the slot;
 configuring the cavity to have a width greater than a thickness of the clasp; and
 translating the tape until the clasp resides within the cavity.

23. The method of claim 22 including the further steps of:
 providing a door coupled to the body and having at least two positions including an open position and a closed position with the open position keeping the slot open and the closed position closing the slot to prevent access by the tape through the slot; and
 closing the door after said attaching step.

\* \* \* \* \*